Sept. 28, 1948.   N. C. LOCKE   2,450,200
LEVELING AND CONTOURING MACHINE
Filed Jan. 22, 1945   4 Sheets-Sheet 1
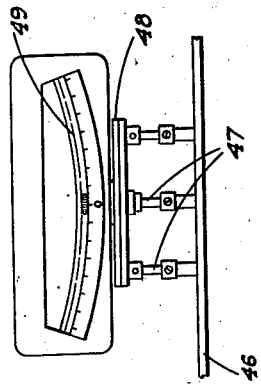
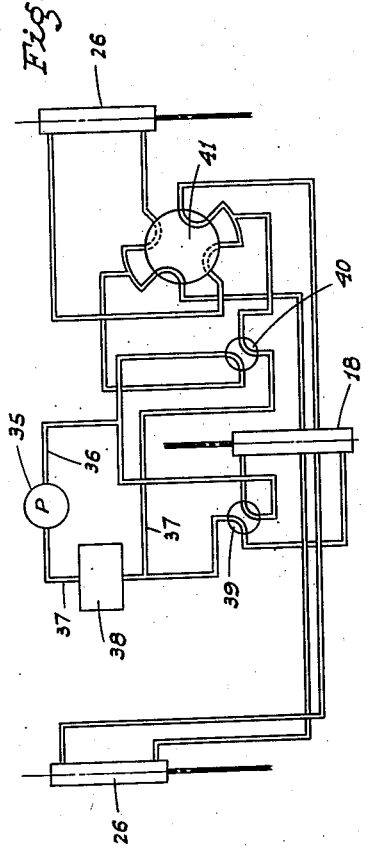
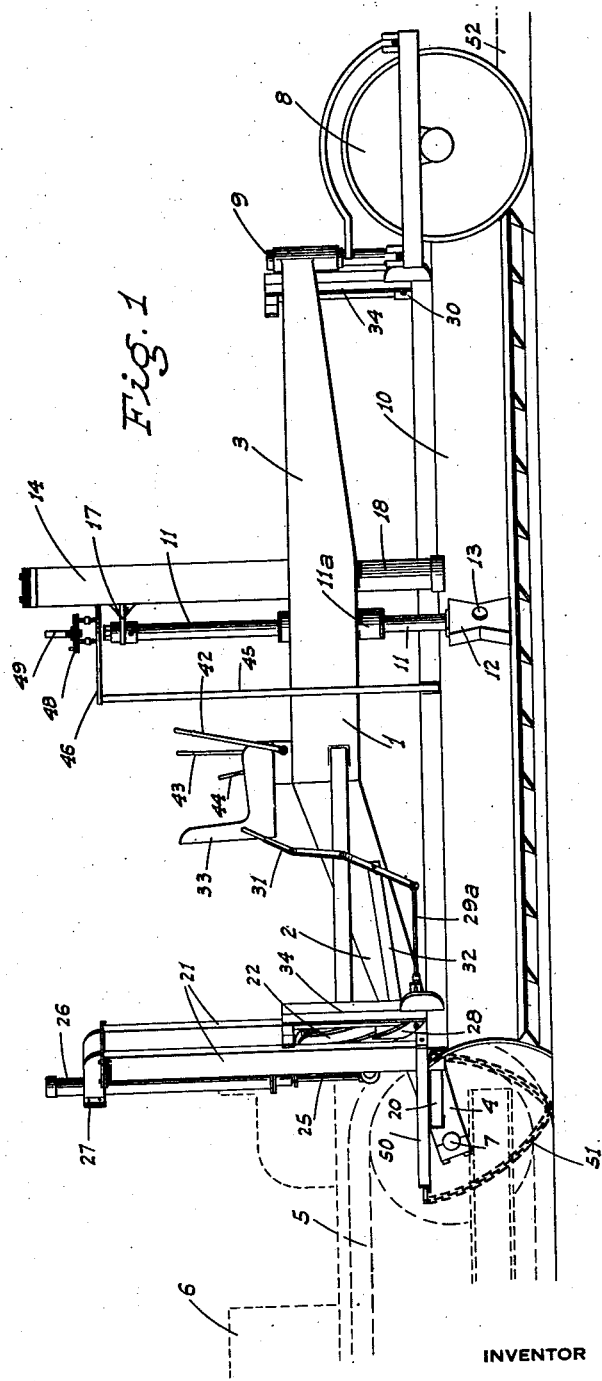
INVENTOR
Niel C. Locke
BY
ATTORNEYS

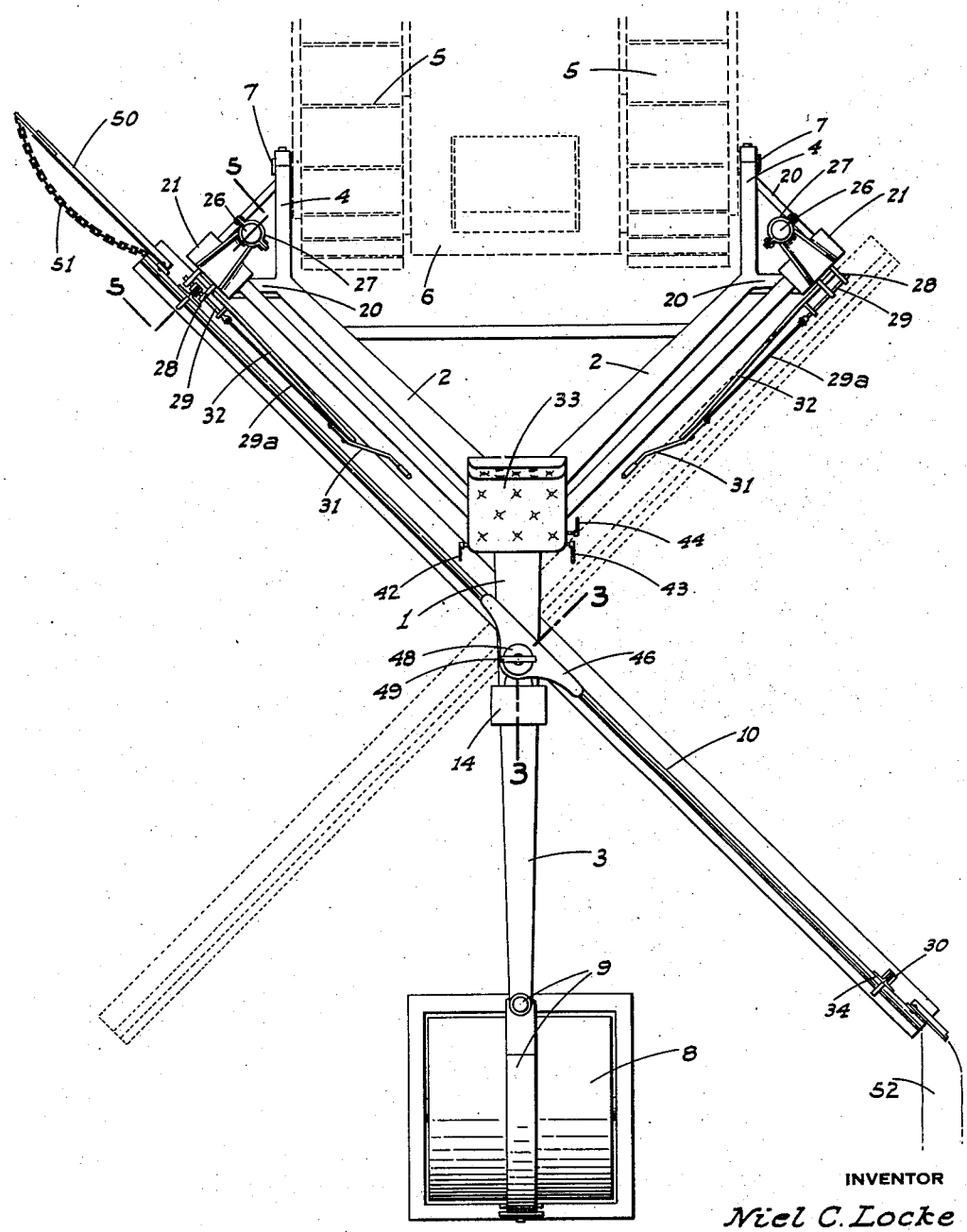

Sept. 28, 1948.　　　　　N. C. LOCKE　　　　　2,450,200
LEVELING AND CONTOURING MACHINE
Filed Jan. 22, 1945　　　　　　　　　　　　　　4 Sheets-Sheet 3
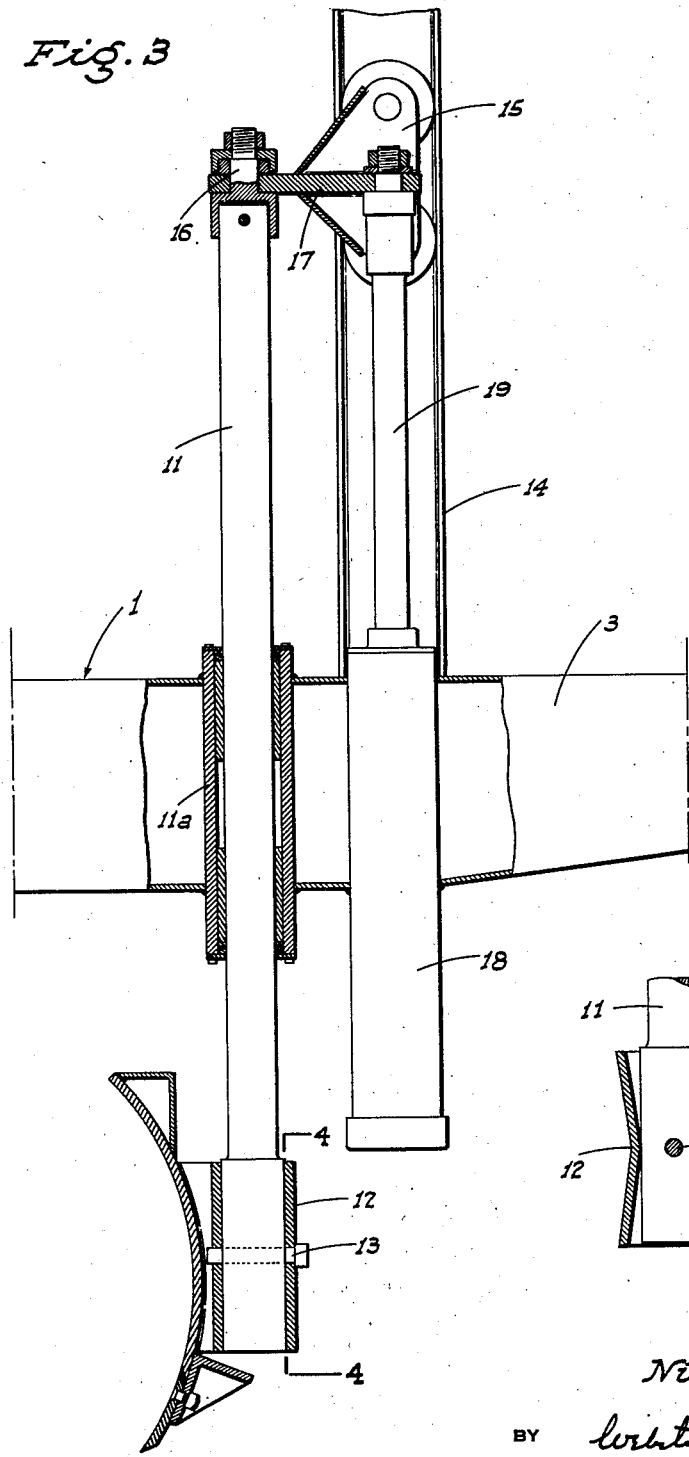
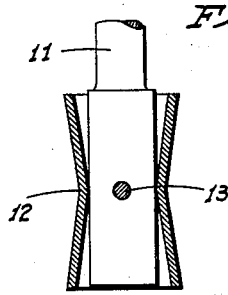
INVENTOR
Niel C. Locke
BY
ATTORNEYS Sept. 28, 1948.  N. C. LOCKE  2,450,200
LEVELING AND CONTOURING MACHINE
Filed Jan. 22, 1945  4 Sheets-Sheet 4
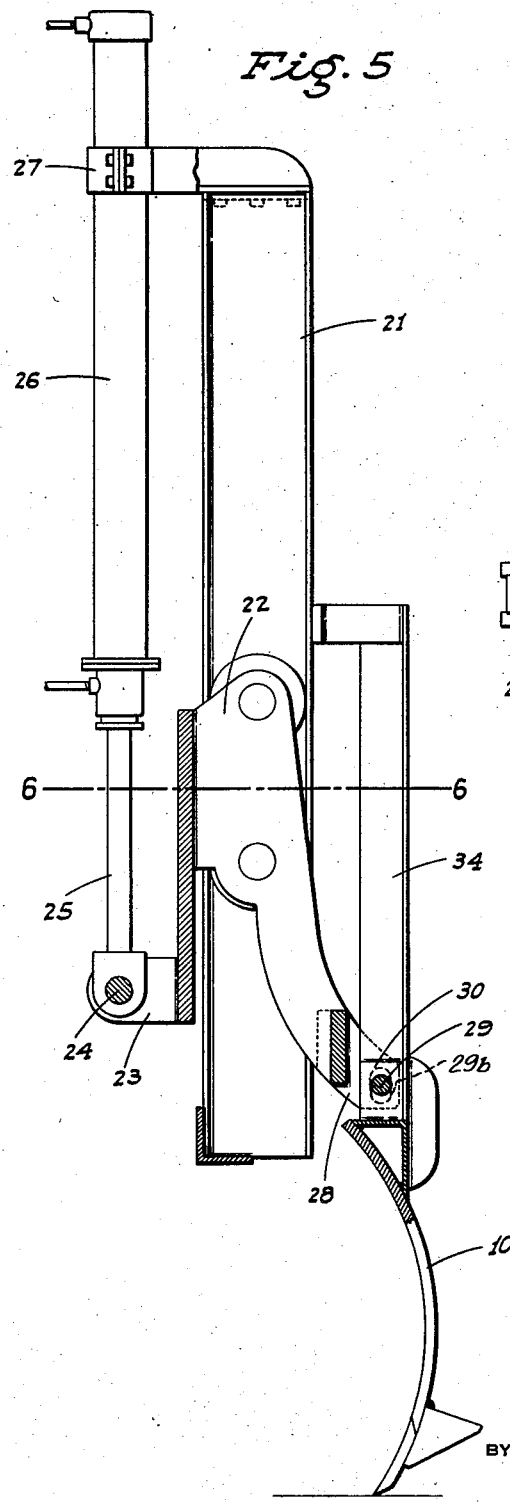
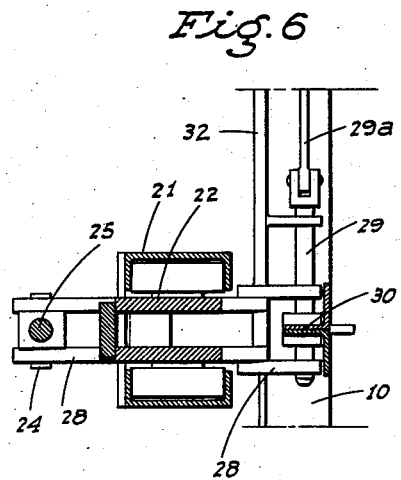
INVENTOR
Niel C. Locke
BY
ATTORNEYS Patented Sept. 28, 1948

2,450,200

UNITED STATES PATENT OFFICE 2,450,200

LEVELING AND CONTOURING MACHINE

Niel C. Locke, Lockeford, Calif.

Application January 22, 1945, Serial No. 573,917

10 Claims. (Cl. 37—178)

This invention relates in general to ground working machines, and in particular the invention is directed to, and it is an object to provide, a novel leveling and contouring machine especially designed for agricultural use.

Another object of this invention is to provide a ground leveling and contouring machine which is adapted to be tractor drawn, and includes a relatively long, transversely extending and angled grader blade; the machine embodying manually controlled power means operative to readily and effectively vary the working elevation of the blade, and to adjust the level thereof.

An additional object of the present invention is to provide a machine of the type described wherein the transversely extending, angled grader blade may be quickly reversed to position said blade at a right or left working angle, selectively; the blade—at either angle—being then positively but releasably secured in working position.

A further object is to provide a leveling and contouring machine which produces smooth ground surfaces, leaving no marks of the tracks of the tractor to which the machine is connected.

A still further object is to provide a leveling and contouring machine operative to accomplish accurate results; the machine being especially designed for cross-leveling of fields and being useful even under extreme ground contour conditions.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1 is a side elevation of the leveling and contouring machine as connected to a tractor.

Figure 2 is a plan view of said machine.

Figure 3 is a fragmentary enlarged sectional elevation on line 3—3 of Fig. 2.

Figure 4 is a fragmentary cross section on line 4—4 of Fig. 3.

Figure 5 is a fragmentary enlarged sectional elevation on line 5—5 of Fig. 2.

Figure 6 is a fragmentary cross section on line 6—6 of Fig. 5.

Figure 7 is a fragmentary view illustrating the front of the level indicator, together with its mount.

Figure 8 is a diagrammatic view of the fluid pressure control system for the several power cylinders.

In all of the above views, with the exception of Fig. 8, the conduits which comprise the fluid pressure system have been omitted for the purpose of clarity.

Referring now more particularly to the characters of reference on the drawings, the machine comprises a main frame, indicated generally at 1, which is substantially Y-shaped in plan and includes forwardly diverging legs 2 and a longitudinal rearwardly extending leg 3. At its forward end the frame 1 is provided with forwardly projecting parallel extensions 4 on the outer and forward ends of the legs 2. The extensions 4 are adapted to be disposed alongside the tracks 5 of a tractor, which is indicated generally at 6; the forward end portions of the extensions 4 being pivotally connected to the rear trunnions 7 of said tracks 5. In this manner the frame 1 is connected in draft relation to the tractor 6 and yet is relatively vertically tiltable.

At its rear end the frame 1 is supported by a swivelly mounted or caster-type ground engaging roller 8 attached by means of a mount, indicated generally at 9, to the rear end portion of the leg 3.

A relatively long transversely extending grader blade 10 extends transversely below the frame 1 intermediate the ends of the latter; said blade being connected centrally of its ends to a vertical, elongated king pin 11. At its lower end the king pin 11 extends into a vertical sleeve 12 fixed in connection with the blade 10 at the rear of the latter; the lower end of the king pin being pivoted in said sleeve by a cross pin 13 which extends lengthwise of the direction of travel, and said sleeve 12 being flared, as shown in Fig. 4, to permit of a certain amount of swinging movement of the blade 10 about the pin 13 for the purpose of leveling said blade transversely of the tractor, and in the manner as will hereinafter appear.

The king pin 11 projects upwardly through a vertical guide sleeve 11a extending through the leg 3 of frame 1 adjacent the forward end of said leg; the blade 10 thus being mounted for horizontal swinging movement, about the king pin as an axis, between the angled position shown in full lines to the position shown in dotted lines, in Fig. 2, and which change or reversal of angle is dependent upon working conditions and the direction of travel of the tractor.

Directly to the rear of the vertical king pin 11 the leg 3 is fitted with a vertical guideway 14 in which a vertically movable carriage 15 rides; the upper end of the king pin 11 being swivelly connected, as at 16, with the carriage 15 by means of an outwardly projecting bracket 17.

The carriage 15 is power elevated by means of a double acting, hydraulic power cylinder 18 fixed vertically in connection with the leg 3 directly below said carriage, said power cylinder including an upwardly projecting piston rod 19 connected at its upper end to said carriage 15. It will be seen that upon raising or lowering of the piston rod 19 the carriage, together with the king pin 11 and grader blade 10, will have a like motion imparted thereto. By reason of the pivotal connection 16 the king pin, together with the grader blade 10, is nevertheless rotatable as a unit between right or left angled positions, as shown in Fig. 2.

Adjacent the forward ends of legs 2 and supported by laterally extending horizontal brackets 20 there are upstanding guideways 21, each of which includes a vertically movable carriage 22 having a forwardly projecting ear 23 pivotally connected, as at 24, to the lower end of the piston rod 25 of a double acting hydraulic power cylinder 26 fixed in connection with the upper end portion of the corresponding guideway, as at 27, and depending alongside the latter. Operation of the power cylinder 26 causes raising or lowering of the corresponding carriage 22.

Each carriage 22 includes a downwardly and outwardly curved arm unit 28 adapted to be detachably coupled at its lower end, and by means of an axially movable latch pin 29, with an ear 30 projecting from the back of the corresponding end of the grader blade 10. In either the right or left angled position of said grader blade the then foremost end of the blade is coupled to the adjacent carriage 22 in the manner above described; such coupling being releasable upon pulling of the corresponding pin 29, which is accomplished through the medium of a linkage 29a which leads from each of said pins rearwardly and inwardly to connection with the lower end of an upstanding hand lever 31 pivotally connected intermediate its ends on a supporting member 32 which is fixed in connection with the corresponding carriage 22. The levers 31 extend upwardly adjacent but on opposite sides of a control operator's seat 33 fixed on the frame 1 in rearwardly facing relation at the forward end of the leg 3 ahead of the king pin 11. When it is desired to change the working angle of the blade, the operator swings one of the levers 31 necessary to release said blade, and thereafter the blade is swung about to its other working position. When the blade reaches such other working position, the operator manipulates the other one of said levers 31 to couple the then forward end of the blade in connection with the adjacent carriage 22. Upstanding stops 34 adjacent the ends of the blade are positioned to engage corresponding guideways 21 to properly locate the coupling means before engagement thereof.

When the blade is set in either its right or left angled working position, the elevation of the blade is controlled by the power cylinder 18, while the level of said blade is controlled by the power cylinder 26 corresponding to the carriage 22 to which the blade is then coupled. By actuating said power cylinder 26 in one direction or the other a corresponding adjustment of the adjacent end of the blade 10 is obtained, causing said blade to pivot around the cross pin 13, thus effecting a leveling adjustment of said blade. There would, of course, be a loose fit provided between the pin 29 and the arm unit 28 to allow of the relative movement therebetween with the limited tilting of the end of the blade. This loose fit would best be provided by slots 29b in the arm unit 28 as shown in Fig. 5.

The power cylinder 18 and the power cylinders 26 are selectively controlled, by a rearwardly facing operator on the seat 33, by means of the fluid pressure system shown diagrammatically in Fig. 8, and which system comprises generally the following arrangement:

A tractor engine actuated pump 35 has a feed conduit 36 leading from the outlet and a return conduit 37 connected with the intake of said pump; the return conduit 37 including a fluid reservoir 38 therein. The above feed and return conduits are arranged by means of the disclosed piping system to be connected in actuating relation to the cylinder 18 by means of a four-way valve 39. Another four-way valve 40 is connected between the feed conduit 36 and the return conduit 37 and a transfer valve 41, said transfer valve being operative to establish selective communication between either of the cylinders 26 and said valve 40. With the transfer valve 41 in one position the valve 40 controls operation of one of the cylinders 26 while in another position of said transfer valve the valve 40 controls operation of the other cylinder 26. The valves 39 and 40 are fitted with actuating levers 42 and 43 upstanding on opposite sides of the operator's seat 33, while the transfer valve 41 is operated by another lever 44. By reason of this arrangement the lever 43 is operative, in selective positions of the transfer valve 41, to control either of the cylinders 26.

In order that the operator on seat 33 may determine the level of the grader blade 10 the following arrangement is provided:

Posts 45 upstand from the blade 10 on opposite sides of the leg 3 and said posts are spanned at their upper end by a cross member 46 carrying adjustable legs 47 supporting a turntable unit 48 on which a level indicator 49 is mounted; the turntable 48 making it possible for the operator to turn the level indicator 49 in facing relation to himself for ease of vision. The adjustable legs 47 are used to initially and accurately set the level indicator 49, which thereafter serves to visually indicate to the operator the position of the grader blade 10.

At opposite ends the grader blade supports relatively short, outwardly projecting booms 50, from each of which a looped chain 51 depends for ground engagement; said looped chains dragging on the ground beyond opposite ends of the grader blade to smooth out any ridges which may be formed thereby.

One such ridge or check, as indicated at 52 in Figs. 1 and 2, is formed at the rearmost edge of blade 10 with each pass of the machine along the field. The corresponding area of the field is thus graded and check at the same time leaving the ground ready for planting without further work.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An earth working machine comprising a frame supported above and for movement along the ground, a transverse grader blade disposed beneath the frame, means suspending the blade from the frame for horizontal swinging movement between reversely angled positions, and separate transversely spaced supporting means on the frame adapted to detachably couple with a corresponding end portion of the blade when the latter is angled to dispose said end portion forward; the blade being suspended from the frame for tilting adjustment transversely of the direction of travel whereby to level said blade, each of said separately supporting means including a carriage in a substantially vertical plane to which the corresponding blade end is adapted to connect, a power cylinder operative to raise or lower said carriage in a substantially vertical plane an operator's seat on the frame, and manually actuated means arranged to releasably couple the ends of said blade with the corresponding supporting means, said manually actuated means being remote controlled by the operator from the seat.

2. An earth working machine comprising a frame supported above and for movement along the ground, a transverse grader blade disposed beneath the frame, means suspending the blade from the frame for horizontal swinging movement between reversely angled positions, and separate transversely spaced supporting means on the frame adapted to detachably couple with a corresponding end portion of the blade when the latter is angled to dispose said end portion forward; the blade being suspended from the frame for tilting adjustment transversely of the direction of travel whereby to level said blade, each of said separate supporting means including an upstanding guide way mounted on the frame, a vertically movable carriage on each guide way, a vertical power cylinder connected between each guide way and its carriage, and a coupling unit arranged to releasably connect each carriage with the corresponding end portion of the blade.

3. A machine as in claim 2 having an operator's seat on the frame; each coupling unit including a latch pin, and means to actuate said pin from the operator's seat.

4. An earth working machine comprising a frame supported above and for movement along the ground, a transverse grader blade disposed beneath the frame, means vertically adjustably suspending the blade from the frame and for tilting adjustment transversely of the direction of travel whereby to adjust the elevation of the blade and level the same respectively, a power cylinder connected between the frame and blade operative to vertically adjust the latter, and separate vertically adjustable, transversely spaced supporting means on the frame adapted to detachably couple with the corresponding end portion of the blade when the latter is angled to dispose said end portion forward; said separate supporting means each comprising an upstanding guide way mounted on the frame, a vertically movable carriage on the guide way, a separate power cylinder connected between the guide way and carriage, and a coupling unit adapted to detachably connect the corresponding end portion of the blade to said carriage.

5. A machine as in claim 4 including a fluid pressure system connected with said power cylinders, said system embodying control valves operative to cause independent actuation of said first named power cylinder, and either of said separate power cylinders, selectively.

6. An earth working machine comprising a generally Y-shaped forwardly opening frame, said frame being adapted for connection at the forward end of its divergent legs to a tractor, a wheel supporting the rearwardly extending leg of the frame, a transverse grader blade beneath the frame intermediate its ends, an upstanding king pin secured on the blade intermediate its ends, means turnably and vertically slidably journaling the king pin in connection with the frame for reverse angling and vertical adjustment of the blade, respectively, an upstanding guide way on the frame adjacent the king pin, a vertically movable carriage on the guide way, means swivelly securing the king pin to said carriage, power means to actuate said carriage, and separate vertically adjustable supporting means mounted on corresponding ones of said divergent legs of the frame adapted to detachably couple with the corresponding end portion of the blade when the latter is transversely angled to dispose said end portion forwardly.

7. An earth working machine comprising a generally Y shaped forwardly opening frame, said frame being adapted for connection at the forward end of its divergent legs to a tractor, a wheel supporting the rearwardly extending legs of the frame, a transverse grader blade beneath the frame intermediate its ends, means turnably and vertically slidably journaling the king pin in connection with the frame for reverse angling and vertical adjustment of the blade, respectively, an upstanding guide way on the frame adjacent the king pin, a vertically movable carriage on the guide way, means swivelly securing the king pin to said carriage, power means to actuate said carriage, and separate vertically adjustable supporting means mounted on corresponding ones of said divergent legs of the frame adapted to detachably couple with the corresponding end portion of the blade when the latter is transversely angled to dispose said end portion forwardly; said separate supporting means each comprising an upstanding guide way, a vertically movable carriage on the guide way, power means to actuate the carriage, and a coupling unit adapted to detachably connect the corresponding end portion of the blade to the carriage.

8. A machine as in claim 7 in which said power means comprises a separate power cylinder connected between each guide way and the corresponding carriage.

9. A machine as in claim 6 in which said forwardly divergent legs of the frame include, at the front end, forwardly projecting, parallel extensions adapted for pivotal connection with the rear trunnions of the tracks of a tractor.

10. An earth working machine comprising a frame supported above and for movement along the ground, a transverse grader blade beneath the frame, means suspending the blade from the frame, a boom projecting laterally out from each end of the blade, and a looped drag chain depending from each boom for ground engagement adjacent but beyond the corresponding end of the blade.

NIEL C. LOCKE.

REFERENCES CITED

The following references are of record in the file of this patent:

UNITED STATES PATENTS

| Number | Name | Date |
|---|---|---|
| 367,659 | Pennock | Aug. 2, 1887 |
| 1,158,805 | Haynes | Nov. 2, 1915 |
| 1,723,931 | Gilbert | Aug. 6, 1929 |
| 2,063,537 | Beard | Dec. 8, 1936 |
| 2,160,193 | Arndt | May 30, 1939 |